8845X

I. Gay,

Making Sash.

Patented May 29, 1835.

A.M. PHOTO-LITHO. CO. N.Y. (OSBORNE'S PROCESS)

8845X

2 Sheets—Sheet 2.

I. Gay,

Mortising Sash.

Patented May 29, 1835.

AM. PHOTO-LITHO. CO. N.Y. (OSBORNE'S PROCESS)

Ira Gay of Dunstable County of Hillsborough & State of New Hampshire

Letters Patent

The schedule referred to in these Letters Patent and making part of the same containing a description in the words of the said Ira Gay himself of his improvement in a machine for mortising sash doors and blinds and other articles &c—

---

To all to whom these Presents shall come, Be it known that I Ira Gay of Dunstable, in the county of Hillsborough and State of New Hampshire have invented or combined and constructed and put in use a machine for mortising sash doors and blinds and other articles usually mortised in a joiner's shop. The object of the machine is to save much labor, and execute the work in a more workmanlike manner than it is usually done and that the following is a full and exact description of the construction and operation of the said machine as invented or combined by me. A. A. A. A at fig.^s 1. 2.^d & 3.^d shows the frame that supports the machine b b b b at fig. 1. 2 and 3.^d are ways to admit the slides c.c. at fig 1. and 2.^d which are fitted in the ways by grooves as seen at fig. 3- The shape of the slide may be seen at fig 5.^th on the slides at each end are two moveable pieces of iron seen at d.d. fig. 1. 2.^d and 3.^d which are made fast at any place required by the screws c.c.c.c seen at fig. 1. & 2.^d and are kept from working sideways by stands which are cast solid in the slides c.c the stands may be seen at f f f f. fig. 1. 2 and 3.^d g.g. fig. 1. represents the chisels which are made fast to the irons d.d by means of the set screws h.h. seen at fig. 1- the socket and chisels may be seen at A.A fig 5. The slide on which the chisels are placed are carried back and forward by means of the crank I which is attached to the shaft j. the slide is connected with the crank by means of the arm K fig. 1. The wood to be mortised is placed on the carriage l l fig 1. g.g. fig 2 shows the manner in which the slides are fitted to the ways, the ways may be seen at fig 4.^th

Figure 1:
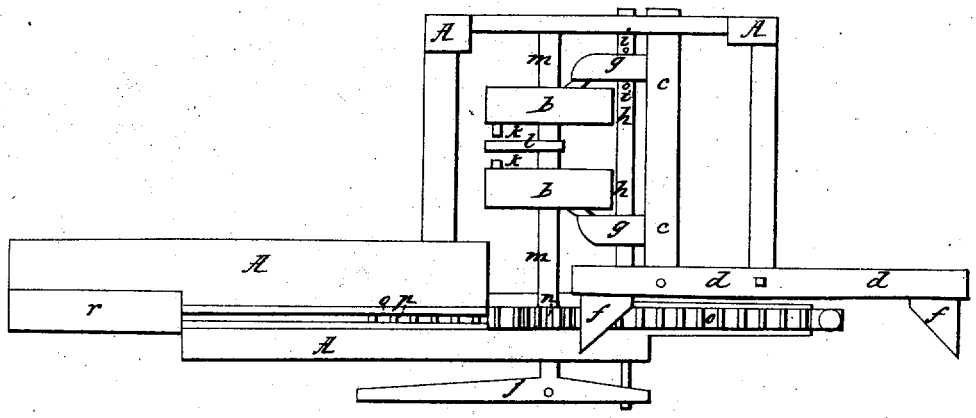
Figure 2:
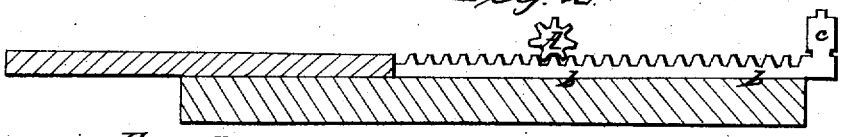
Figure 3:
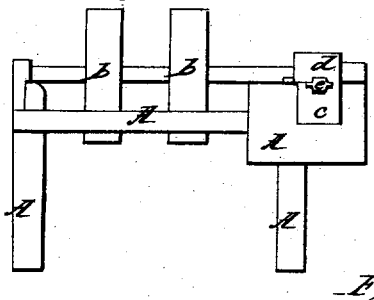
Figure 4:
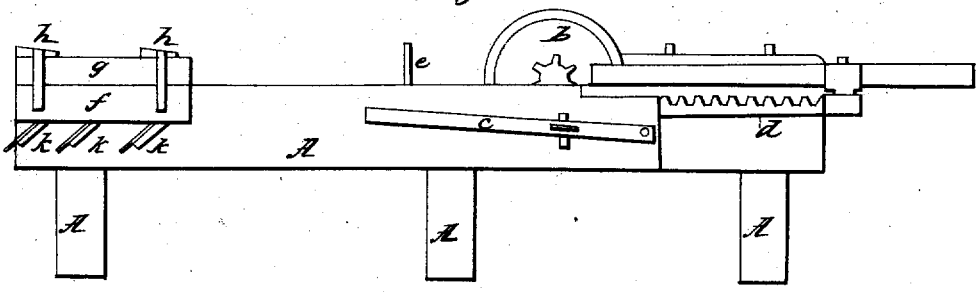
Figure 3:
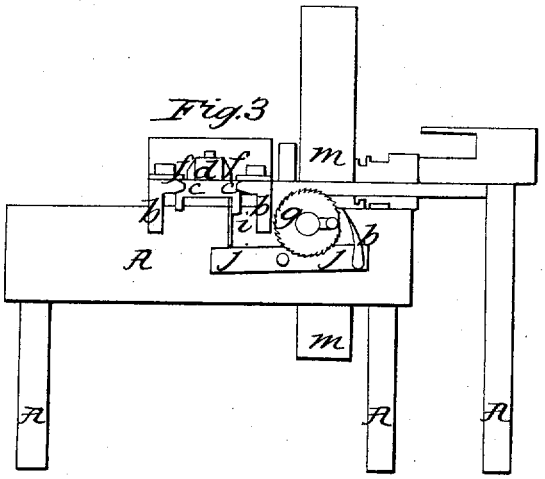
Figure 4:
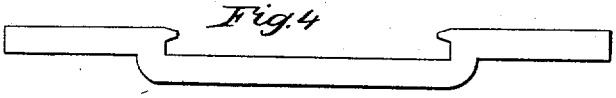
Figure 5:
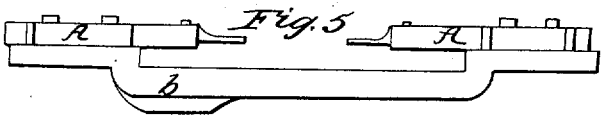

88457 the wood to be mortised is held by means of irons seen at m.m.m.m
fig 1.st at h.h fig. 2.d they are fastened to any place by screws seen at
n.n.n.n fig. 1.st at i.i fig 2.nd The carriage l.l is carried forward by the
ratchet wheel seen at o fig 1. at j fig 2. at g fig 3. the hand k fig 3 which
feeds the ratchet wheel is moved up and down by the lever j. j. fig 3 to
which it is attached, when the slides are carried back and forward the
lever, play up and down over the ends of the wood 1 fig 3. seen also
at b fig. 5 - The hand is held upon the ratch by a spiral spring - On
the shaft that the ratch is upon, is a pinion which plays in a rack
which is fastened to the carriage ll by which means the carriage is
moved when the ratch wheel is turned - The manner in which the machine
is put in motion is by a clutch p at fig. 1 represents a handle seen also
at k fig. 2.d n. is a collar on the shaft which moves with the handle
and the arm S connected with the collar moves back and forward
with the handle also, and as the arm S moves up the pin t. which passes
through the pulley seen at u fig 1 at m fig 2.d strikes the arm w -
seen at fig. 1.st which is fastened to the shaft by which means the
put in motion. Having in the foregoing described the manner in which the machine is
machine is constructed and the same is to be used - I do hereby
declare, that I do not claim any part of said Machine as new
in itself, but claim the combination of the known mechanical
contrivances in such a manner as has not heretofore been used
for the purpose herein described, believing the machine of much
greater value than any heretofore in use Witnesses
Isaac Spalding
Chs. H. Nutt -

Ira Gay (Drawing)

Exd. WgL